United States Patent

[11] 3,610,931

| [72] | Inventor | Martin G. Woolfson |
| | | 3411 Merle Drive, Baltimore, Md. 21207 |
| [21] | Appl. No. | 798,308 |
| [22] | Filed | Feb. 11, 1969 |
| [45] | Patented | Oct. 5, 1971 |

[54] THERMISTOR CIRCUIT FOR DETECTING INFRARED RADIATION
8 Claims, 8 Drawing Figs.

[52] U.S. Cl. ................................................ 250/83.3 H
[51] Int. Cl. ................................................ G01j 5/20
[50] Field of Search ........................................ 250/83.31 R, 83.3 IR

[56] References Cited
UNITED STATES PATENTS

| 3,487,213 | 12/1969 | Horan et al. | 250/83.3 |
| 3,379,883 | 4/1968 | Ward et al. | 250/83.3 IR |
| 3,476,938 | 11/1969 | Jankowitz et al. | 250/83.3 IR |

*Primary Examiner*—Archie R. Borchelt
*Attorneys*—F. H. Henson, E. P. Klipfel and J. L. Wiegreffe ABSTRACT: A radiation-detecting circuit including a first thermistor voltages to be exposed to the radiation to be detected and a second thermistor connected to the first thermistor and arranged to be isolated from such incoming radiation while being subjected to the same ambient thermal conditions as the first thermistor, the circuit being arranged to apply opposite polarity biasing pulses to the thermistors, to produce an amplified version of the difference between the voltages across the two thermistors during the occurrence of the biasing pulses, and to vary the amplitude of the pulses applied to the second thermistor in response to the circuit output so as to balance the voltages across the two thermistors with respect to low frequency thermal variations.

INVENTOR
Martin Gerald Woolfson
ATTORNEY

THERMISTOR CIRCUIT FOR DETECTING INFRARED RADIATION

BACKGROUND OF THE INVENTION

The present invention relates to radiation detectors, and particularly to infrared radiation detectors employing thermistors.

Thermistors, because of their radiation sensitivity, are widely used as the sensing element in modern radiation detectors, particularly those employed for detecting infrared radiation. Thermistors are useful for such purposes because of their large negative temperature coefficient of resistance and because they can be made quite sensitive to radiation variations.

In order to provide an indication of the resistance variations experienced by a thermistor in response to incident radiation, it is necessary to apply a biasing voltage thereto so that resistance variations of the thermistor will appear as variations in the voltage drop across, or current through, the thermistor. This voltage or current variation will then serve, after suitable amplification, as an indication of the resistance variations of the thermistor in response to received radiation.

Since a given variation in the received radiation will produce a given variation in the thermistor resistance, it follows that the amplitude of the corresponding thermistor voltage or current variation will be proportional to the amplitude of the applied voltage. Therefore, the responsivity, i.e. the ratio of the thermistor output voltage to received power, will increase as the amplitude of the biasing voltage increases. However, an upper limit is imposed on the amplitude of this biasing voltage since it must remain low enough to assure that the thermistor will not undergo thermal runaway, this occurring when the thermistor is heated to a point at which its resistance characteristic enters its negative resistance region, or voltage breakdown. Thus, for a given thermistor, its responsivity is limited to a certain maximum value when DC bias is employed.

Since the resistance of a thermistor is determined by its temperature, its resistance will vary in response not only to variations in the amplitude of the incident radiation to be sensed, but also in response to variations in the ambient temperature. In order to compensate for ambient temperature variations, which would introduce inaccuracies into the radiation measurement, it is known to couple the radiation-sensing thermistor with a compensating thermistor in a type of bridge circuit. The compensating thermistor is normally shielded from the radiation being received by the active thermistor but is exposed to the same ambient temperature as that thermistor so as to balance the bridge circuit with respect to changes in ambient temperature.

The output from such a bridge circuit, which is taken at the point of connection between the two thermistors, is normally AC coupled to the input of a preamplifier in order to pass only the bridge unbalance component, this being the component which is produced by the incident radiation and which generally varies more rapidly than does the ambient temperature. Such variation may be the result either of normal fluctuations in the amplitude of the incident radiation or of the action of a mechanical chopper disposed in front of the active thermistor and acting to introduce a modulation into the unbalance component containing the radiation information.

In either event, the information contained in the bridge unbalance component extends over a very low-frequency band. Since semiconductor preamplifiers, which are employed in such circuits because of their highly advantageous small size and weight and low-power requirements, have a noise characteristic which is inversely proportional to frequency, and which is hence referred to as "$1/f$ noise," and which increases considerably at low frequencies, the degree to which the low-frequency bridge unbalance component can be amplified is quite limited.

Moreover, when a mechanical chopper is employed to introduce a modulation onto the thermistor output signal, the chopper serves to block the transmission of radiation to the thermistor during one-half of each modulation period, thus resulting in the loss of a substantial portion of the radiation information.

It has already been proposed to apply an AC bias to the thermistors of such a device in order to place the thermistor output signal at a frequency which is above the high $1/f$ noise region of the semiconductor preamplifier. According to such proposals, the bias signal has a sinusoidal waveform and it is known that this presents certain drawbacks.

Because no two thermistors are electrically identical and, in particular, will invariably have different stray capacity values, the responses of the two thermistors in the bridge circuit to the sinusoidal biasing voltage will be phase-shifted with respect to one another. This phase shift causes the difference between the signals across the two thermistors to have a quadrature component so that thermal unbalances of the bridge circuit can only be partially nulled. Because of the presence of this component, it is necessary to demodulate the error signal immediately after preamplification in order to prevent saturation in subsequent amplifier stages and such subsequent stages must therefore be constituted by DC amplifiers.

SUMMARY OF THE INVENTION

It is a primary object of the present invention to overcome these drawbacks and difficulties.

Another object of the invention is to substantially enhance the responsivity of such thermistor detectors without raising the temperature of the thermistors above a safe value.

Another object of the invention is to electrically modulate the thermistor response signal while avoiding the difficulties previously encountered due to the differences between the electrical characteristics of two thermistors.

Yet another object of the invention is to automatically balance the bridge circuit of such a detector with respect to long-range variations in its output.

A still further object of the invention is to provide a detector circuit in which AC amplification of the bridge output signal can be employed up to the final circuit output.

These and other objects according to the invention are achieved by the provision of certain improvements in a radiation detector including an active thermistor arranged to receive the radiation to be detected, a compensating thermistor shielded from the radiation to be detected, and an AC preamplifier whose input is connected to one end of each thermistor. According to the improvement provided by the invention, the detector further includes pulse generator means connected to the thermistors for applying a first train of electrical pulses to the active thermistor and a second train of electrical pulses to the compensating thermistor, the first and second pulse trains being in synchronism and polarity opposition so that the resulting electrical signal applied to the preamplifier by the active thermistor is opposite in polarity from the electrical signal applied to the preamplifier by the compensating thermistor. In further accordance with the improvement according to the invention, the detector also includes amplifier means connected to the output of the preamplifier for producing an output signal proportional to the amplitude of the output of the preamplifier during the occurrence of each electrical pulse, and integrator means connected between the amplifier means and the pulse generator means for varying the amplitude of the pulses of the second train in a direction to equalize the signals from the two thermistors with respect to extraneous conditions which influence the amplifier means output signal and which vary more slowly than does the amplitude of the radiation received by the active thermistor.

DESCRIPTION OF THE PREFERRED EMBODIMENTS

Figure 1:
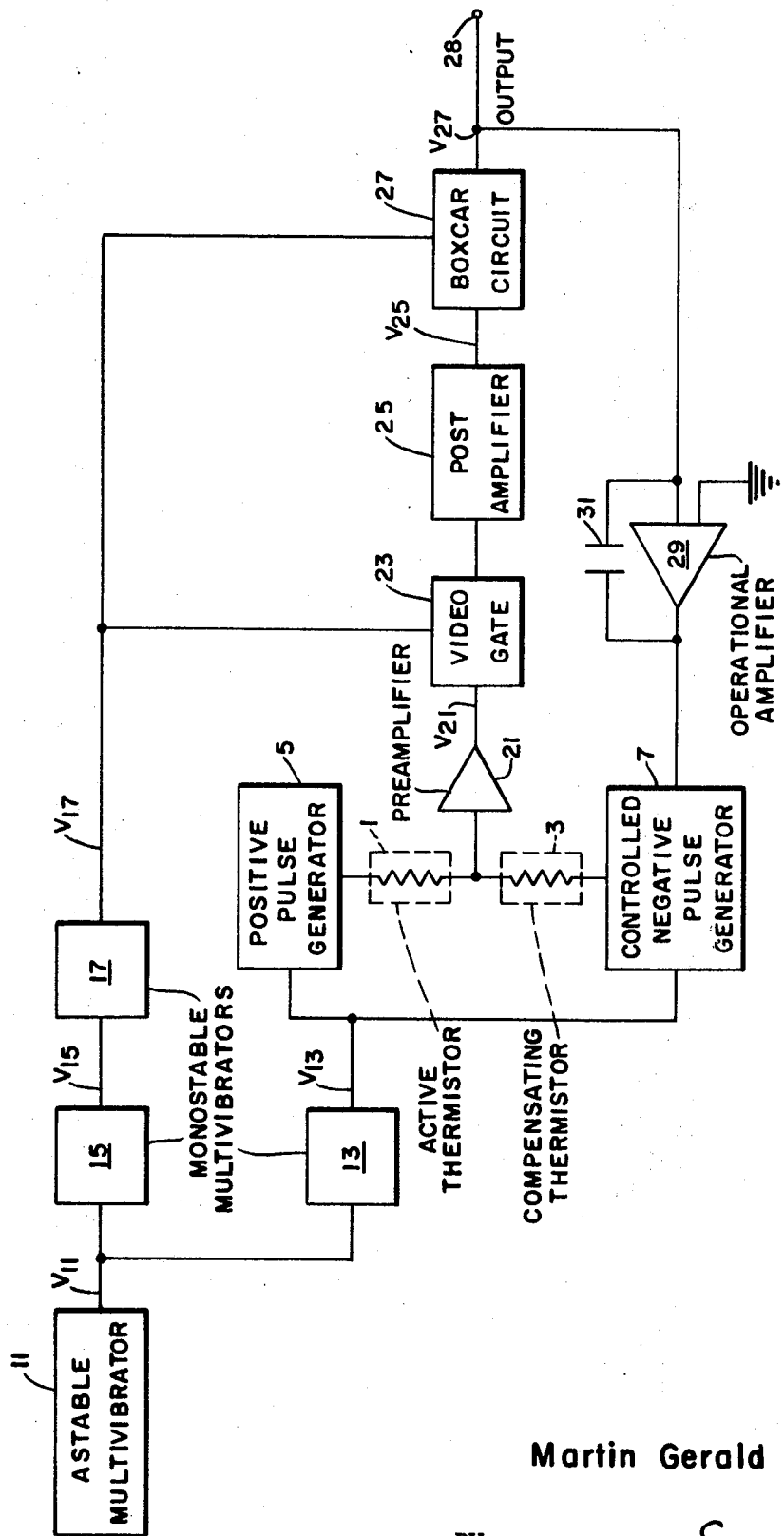
FIG. 1 is a schematic diagram of a preferred embodiment of the invention.

FIG. 1 shows the circuit of a dual thermistor bolometer according to the present invention for detecting infrared radiation. The circuit includes an active thermistor 1 arranged to be exposed to the radiation which is to be detected and a compensating thermistor 3 which is shielded from the incoming radiation and which is controlled, in a manner to be explained below, to compensate for variations in the output of the active thermistor 1 due to variations in the ambient temperature or variations in the outputs of any of the circuit elements due to other gradual, i.e., low-frequency, thermal variations. The two thermistors are preferably constituted by thin discs having a rapid response and a high-power dissipation.

The two thermistors are connected together to form two arms of a bridge-type arrangement which also includes pulse generators 5 and 7, the common connection of the thermistors being connected to the input of a preamplifier 21.

Pulse generator 5 is constructed to produce positive pulses having a constant amplitude and to apply these pulses to the active thermistor 1, while pulse generator 7 produces negative amplitude pulses whose amplitudes are controlled by the output signal from an integrator circuit composed of an operational amplifier 29 and a capacitor 31.

The generators 5 and 7 are controlled by the output of a monostable multivibrator 13 in such a manner that the output pulses from the two generators 5 and 7 will be in synchronism and will have the same duration. Monostable multivibrator 13 is controlled in turn by the output of a self-excited astable multivibrator 11. Also connected to the output of astable multivibrator 11 is a series arrangement of two further monostable multivibrators 15 and 17.

Preamplifier 21 is connected in cascade with a post-amplifier 25 through the intermediary of video gate 23 and the output of the post-amplifier is connected to the input of a boxcar, or "hold," circuit 27 whose output appears at terminal 28 and constitutes the output for the circuit. The output from boxcar circuit 27 is also connected to the input of the operational amplifier integrator 29, 31, which integrator is constructed to have a long time constant compared with the rate of variation of the infrared radiation received by the active thermistor 1.

The operation of this circuit will now be described with reference to the waveform diagrams of FIGS. 2a to 2g.

The output voltage $V_{11}$ produced by the free-running multivibrator 11 has the form of a train of regularly spaced pulses. The trailing edge of each pulse triggers the generation of a pulse by each of the multivibrators 13 and 15, whose outputs are indicated by the waveforms $V_{13}$ and $V_{15}$ in FIGS. 2b and 2c, respectively. The pulses from multivibrator 13 are delivered to generators 5 and 7 to cause them to produce output voltage pulses, the pulses produced by generator 5 having a constant amplitude and the pulses by generator 7 having a variable amplitude.

Generators 5 and 7 are arranged to produce pulses of somewhat longer duration than the triggering pulses produced by multivibrator 13 and are also arranged so that their output pulses are triggered by the leading edge of the pulses produced by multivibrator 13.

The biasing pulse frequency can vary over a wide range. Some of the considerations on which the selection of a particular frequency is based will be discussed in detail at a further point in this description.

One of the factors determining the minimum frequency which can be employed is the thermal time constant of the thermistors, which is not to be confused with their electrical time constant. The thermal time constant of a thermistor is a function of its thermal resistance and thermal capacity and determines the rate at which its resistance changes as the result of a change in the power applied thereto.

It is desirable that this thermal time constant be relatively long in comparison with the biasing pulse repetition period so that the thermistor resistance will not vary in response to the modulation produced by the periodic biasing pulses.

Since thermistors of the type employed in devices according to the invention can be made to have a thermal time constant of one or several msec., a biasing pulse repetition frequency of the order of several kHz. would satisfy this requirement. At such a frequency, the thermistor resistance would not vary noticeably during one biasing pulse period and the thermal behavior of the thermistor would therefore be identical with that produced by a DC biasing voltage having the same average power as the biasing pulse voltage utilized in embodiments of the invention.

This is advantageous because it is desired that the resistance of the active thermistor vary only as a function of the intensity of the received radiation.

Because of stray capacitances associated with the thermistor elements, the response of these elements to the pulses applied thereto will include current transients which appear at the beginning and end of each pulse from the two generators. These transients and the steady-state current between the two thermistors during each pulse from the generators will be amplified by the preamplifier 21, that the output from preamplifier 21 will have the form of the voltage $V_{21}$ shown in FIG. 2e. Since the pulses applied to the two thermistors are of opposite polarities, the transients in the responses of the two transistors similarly have respectively opposite polarities with respect to the preamplifier input terminal so that the transients would tend to nullify one another if the thermistors were electrically identical. However, in practice two thermistors are never electrically identical and the transients illustrated in FIG. 2e in fact constitute the difference between the transients of the two thermistors.

To produce an accurate representation of the value of the radiation to which thermistor 1 is exposed, the circuit should be rendered nonresponsive to the transient portion of the preamplifier input signal. This is accomplished, according to the present invention, by interposing a video gate 23 between the preamplifier 21 and post-amplifier 25 and by controlling the opening of the video gate so as to permit the passage of the output voltage from the preamplifier to the post-amplifier only during a short time interval near the end of the generator pulses.

The opening of video gate 23 is controlled by output pulses from a further monostable multivibrator 17 connected to the output of monostable multivibrator 15. Multivibrator 17 is constructed to produce pulses of shorter duration than multivibrator 15, each pulse from multivibrator 17 being triggered by the trailing edge of a pulse from multivibrator 15. The output from multivibrator 17 is represented by the waveform $V_{17}$ in FIG. 2d and its time relation with the pulses from multivibrator 15 will become clear from a comparison of FIGS. 2c and 2d.

Figure 2A:
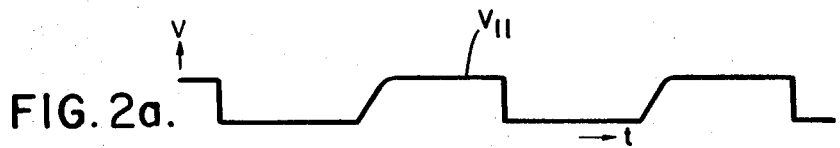
FIGS. 2a, 2b, 2c, 2d, 2e, 2f and 2g are waveform diagrams illustrating the operation of the circuit of FIG. 1.
Figure 2B:
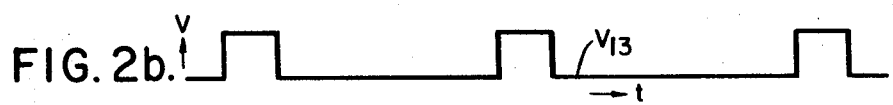
Figure 2C:
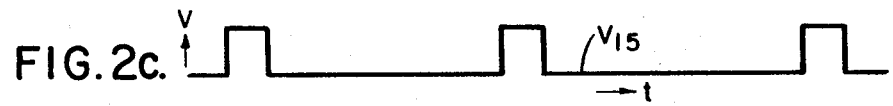
Figure 2D:
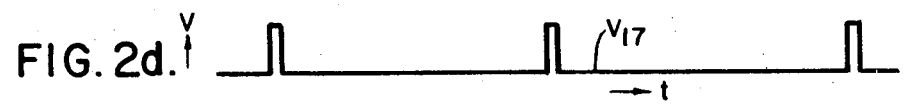
Figure 2E:
Figure 2F:

Thus, video gate 23 is open only during a short period near the end of the pulses from generators 5 and 7, after the initial transient in the response of the thermistors to these pulses has disappeared. The resulting output from post-amplifier 25 is shown in FIG. 2f.

The duration of the transients in the response of the thermistors to the pulses applied thereto depends on the electrical time constant resulting from the thermistor resistance and its associated stray capacitance and it is this electrical time constant which imposes a lower limit on the biasing pulse duration and thus the permissible duty ratio (pulse duration/pulse repetition period) for any given radiation-sampling frequency and hence which limits the maximum enhancement that can be achieved in the thermistor response for a given biasing pulse amplitude.

The output from post-amplifier 25 is delivered to a boxcar circuit 27 whose operation is also controlled by the output pulses from multivibrator 17. Boxcar circuit 27 produces an output signal whose amplitude is proportional to the amplitude of the last pulse received from post-amplifier 25 and whose polarity is that of such pulse.

Figure 2G:
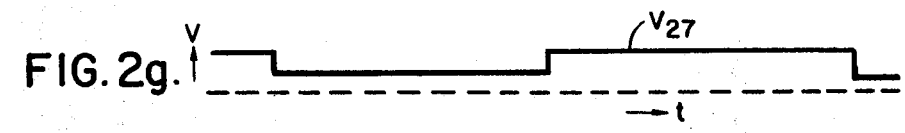

The output from boxcar circuit 27 is represented by the waveform $V_{27}$ shown in FIG. 2g and is applied to the circuit output terminal 28. The output signal from circuit 27 is also delivered as the input to the operational amplifier integrator 29, 31 and the resulting integrator output is delivered to pulse generator 7 so as to control the amplitude of the pulses produced thereby.

The integrator 29, 31 is designed to have a very long time constant so that its output will be influenced only by very low frequency variations in the thermistors and the other elements of the circuit due to thermal effects. The output voltage from the integrator controls pulse generator 7 in such a manner as to vary the amplitude of its pulses in a direction to cause the input signal to preamplifier 21 to approach zero with regard to such thermal effects.

Those variations in the signal amplitude due to variations in the level of the infrared radiation sensed by thermistor 1 and having frequencies above the cutoff frequency of the control loop formed by integrator amplification 31 will appear at the output 28 with an amplification proportional to the product of the preamplifier and post-amplifier gains, minus, of course, any losses in the video gate 23 and the boxcar circuit 27. In other words, with respect to the received signal, the circuit functions as a highpass filter having a lower frequency cutoff and therefore yields outputs comparable to those which would be obtained in a circuit which is AC-coupled to the thermistors and which operates under DC bias conditions.

It has been found in practice that a circuit of the type shown in FIG. 1 can be constructed to achieve automatic balances down to levels equivalent to the Johnson noise output of the thermistors, and to have an enhancement factor of the order of 3.7 with regard to equivalent circuits employing pure DC bias.

Thus, the utilization of pulse biasing, according to the present invention, permits higher amplitude voltage pulses to be applied to the thermistors so as to increase their responsivity (volts out/watts in) while maintaining the average power dissipation of the thermistors at a value sufficient to prevent thermal runaway, which occurs when the thermistor is heated to a point which causes it to enter its negative resistance region. Since the responsivity of the device will be determined by the amplitude of the voltage pulses delivered thereto, this responsivity can thus be increased, for the same average biasing power, by a factor of $\sqrt{1/p}$, where $p$ is the duty ratio, or duty factor, of the generator output pulses, compared with circuits employing conventional DC biasing.

The automatic balancing of the circuit with respect to very low frequency thermal variations permits AC amplification to be employed up to the output of the device. Moreover, the gating employed in circuits according to the invention serves to isolate subsequent amplifier stages from the transients appearing in the thermistors and hence permits high-gain amplifiers to be employed.

In practical embodiments of the present invention, satisfactory operation can be achieved over a wide range of biasing pulse repetition rates. The rate selected should be sufficiently high to provide a suitable information-sampling frequency and to cause the preamplifier to operate in its low $1/f$ noise region. On the other hand, the upper limit of the biasing pulse repetition rate is dictated by the requirement that each biasing pulse have a sufficient duration to permit the disappearance of the transient in the response of each thermistor at the start of a pulse. This transient is determined by the electrical time constant of the thermistor, which can be of the order of several microseconds. These requirements can be satisfied by a pulse repetition rate of the order of several kHz. and a pulse duty factor of between 0.05 and 0.25, a repetition rate of 5.7 kHz. and a duty factor of 0.1 having produced particularly good results, although these values are only given by way of example.

Preamplifier 21 is preferably designed to have a bandwidth which is sufficiently wide to permit passage of the information content of the pulse-modulated signals applied to its input. On the other hand, since the amplitude of the noise signal passed by the preamplifier is proportional to it transmission bandwidth, it is desirable that this bandwidth not be unnecessarily large. In practice it has been found that a satisfactory compromise is achieved between these competing considerations if the preamplifier is designed to have an upper cutoff frequency which is greater than the pulse repetition frequency and which is in the range of small multiples of that frequency.

The integrator 29, 31 should have a long time constant, preferably of the order of several seconds.

The circuit illustrated in FIG. 1 could be arranged so that the active thermistor continuously receives the radiation to be measured, in which case the bridge-balancing operation performed by integrator 29, 31 will cause the output appearing at terminal 28 to be proportional to variations in the amplitude of the received radiation. An output of this type will be suitable in many situation since it often occurs that the radiation being measured varies rapidly compared with the time constant of the integrator.

However, in certain situations it is desireable to assure that the output from the device will not go to zero if the amplitude of the received radiation should vary slowly or not at all. This could be accomplished by interposing a radiation chopper between the active thermistor 1 and the radiation source. Such a chopper is preferably arranged to have a chopping rate that is high in comparison with the integrator time constant and low in comparison with the thermistor thermal time constant, which differs from the thermistor electrical time constant. Thermistors of the type preferably employed in the embodiments of the present invention have thermal time constant of the order of one or a few milliseconds and may be used with a chopper having a chopping rate of the order of seconds or fractions of a second.

While choppers have been employed in prior art thermistor radiation detector circuits, these choppers were always used as the modulating element for causing the thermistor to have an AC output. To accomplish this, it was necessary for the chopper to block radiation for one-half of each modulation period, with the result that a substantial portion of the incident radiation was prevented from reaching the thermistor and a good deal of radiation information was lost.

In contrast with these arrangements, the present invention employs the biasing signal to produce modulation and the optional chopper is employed only to prevent the circuit output signal from becoming equal to zero in the presence of input radiation having a constant amplitude. Therefore, this chopper can be constructed so as to block radiation during only a small fraction of each chopping period, the chopper being constructed, for example, to block radiation during one-tenth, or less, of each period. As a result, very little of the radiation information will be lost.

It will be understood that the above description of the present invention is susceptible to various modifications changes and adaptations.

I claim:

1. In a radiation detector system including an active thermistor arranged to receive the radiation to be detected and a compensating thermistor shielded from said radiation connected in a bridge circuit having an output terminal between said thermistors, the improvement comprising:
   a. pulse generator means connected to said bridge circuit for applying respective trains of electrical pulses to said active and said compensating thermistors in synchronism and in polarity opposition in the respective thermistors,
   b. means connected to said output terminal and responsive to signals thereon for varying the amplitude of said pulses supplied to said compensating thermistor in a direction to equalize the signals from the respective thermistors with respect to extraneous conditions which effect the signals from said output terminal and which vary more slowly than does the amplitude of the radiation received by said active thermistor, c. a video gate between said output terminal and said amplitude-limiting means, and d. means responsive to said pulse generating means for controlling said video gate to selectively pass to said amplitude-control means selected portions of each of the output pulses from said output terminal.

2. The combination as set forth in claim 1, in which said video gate is operated synchronously with said pulse-generating means.

3. The combination as set forth in claim 2, in which said video gate opens a predetermined time after the occurrence of each electrical pulse and to close said gate before the termination of each such pulse.

4. The combination in claim 1, wherein an output terminal for said system is connected to said amplitude-varying means so that the control signals generated by said latter means constitutes the system output detection signal.

5. The combination as set forth in claim 4, wherein the duration of said pulses is less than 25 percent of the repetition period of the pulse train

6. The combination as set forth in claim 4, wherein a circuit between said bridge output terminal and said system output terminal comprises a holding circuit connected to receive each output pulse from said video gate and to produce an output signal which is proportional to the amplitude of each video gate output pulse and which is maintained until the occurrence of the next succeeding video gate output pulse, the output signal from said holding circuit constituting the output signal of said amplifier means and being delivered to said integrator means.

7. An arrangement as defined in claim 5, wherein said gate control means are arranged so that the predetermined time between the beginning of an electrical pulse from said pulse generator means and the opening of the video gate is at least equal to the electrical time constant of said thermistors.

8. An arrangement as defined in claim 5, wherein the pulse repetition period of each pulse train is substantially shorter than the thermal time constant of said thermistors.